(12) United States Patent
Ferguson et al.

(10) Patent No.: US 8,558,751 B2
(45) Date of Patent: Oct. 15, 2013

(54) DUAL LOOP MAGNETIC EXCITATION FOR MAIL TAG

(75) Inventors: Don Ferguson, Maple (CA); Mircea Paun, Mississauga (CA); Ioan Nicolescu, Mississauga (CA); Alex Oprea, Toronto (CA); Tudor Patroi, Mississauga (CA)

(73) Assignee: Lyngsoe Systems, Ltd., Mississauga (CA)

( * ) Notice: Subject to any disclaimer, the term of this patent is extended or adjusted under 35 U.S.C. 154(b) by 628 days.

(21) Appl. No.: 11/995,155

(22) PCT Filed: Jul. 14, 2006

(86) PCT No.: PCT/CA2006/001164
§ 371 (c)(1),
(2), (4) Date: Jun. 27, 2008

(87) PCT Pub. No.: WO2007/006159
PCT Pub. Date: Jan. 18, 2007

(65) Prior Publication Data
US 2010/0277393 A1    Nov. 4, 2010

Related U.S. Application Data

(60) Provisional application No. 60/698,962, filed on Jul. 14, 2005.

(51) Int. Cl.
*H01Q 21/00* (2006.01)
(52) U.S. Cl.
USPC .......................................... 343/867; 343/866
(58) Field of Classification Search
USPC ........................... 343/742, 867, 866, 853, 855
See application file for complete search history.

(56) References Cited

U.S. PATENT DOCUMENTS

| 5,450,492 A | | 9/1995 | Hook et al. |
| 6,081,238 A | * | 6/2000 | Alicot ............................ 343/742 |
| 6,166,706 A | * | 12/2000 | Gallagher et al. ............. 343/867 |
| 7,469,838 B2 | * | 12/2008 | Brooks et al. .................. 235/493 |
| 2003/0006901 A1 | | 1/2003 | Kim et al. |
| 2004/0252026 A1 | | 12/2004 | Hall |

FOREIGN PATENT DOCUMENTS

| EP | 1489684 | 12/2004 |
| WO | WO03/040950 | 5/2003 |

OTHER PUBLICATIONS

European Search Report in related application No. EP 06761126.9.
Communication from European Patent Office in related application No. EP 06761126.9.

* cited by examiner

*Primary Examiner* — Hoang V Nguyen
*Assistant Examiner* — Kyana R McCain
(74) *Attorney, Agent, or Firm* — Thomas | Horstemeyer, LLP

(57) ABSTRACT

Logistical passage measurement systems are provided. A representative system includes: an excitation unit having dual loop antennae, with a first loop and a second loop, the two loops located in and parallel to the same plane, and adjacent to one another, and a control box for exciting said antennae, the control box arranged to drive the currents of the two loops, such that the phase difference between the currents of said two loops alternates with time between 0° and 180°, and wherein the amplitude of the currents for each loop is of a first level when the phase difference is 180° and wherein said amplitude is of a second level, lower than the first level, when the phase difference is 0°.

7 Claims, 17 Drawing Sheets

Loop 1    Control Box    Loop 2

Phased Loops

Anti-Phased Loops

Phased Loops

Anti-Phased Loops

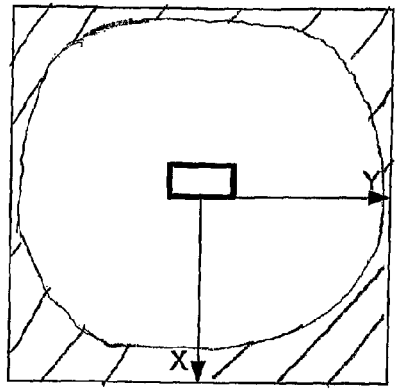
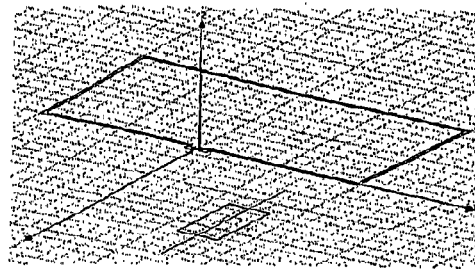
BLACK ZONES 
Single Loop
Figure 25
Tag position
Figure 26
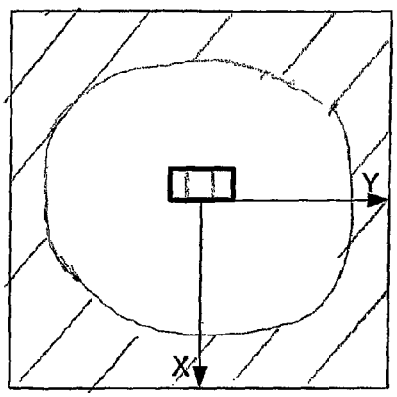
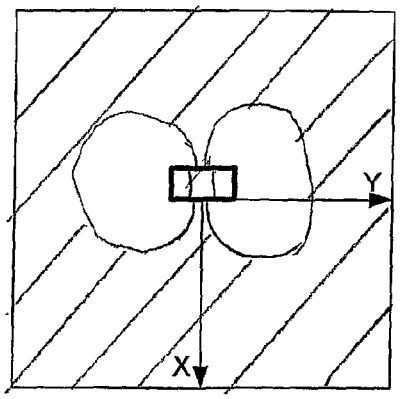
BLACK ZONES 
Phased Loops
Figure 27
Anti-Phased Loops
Figure 28

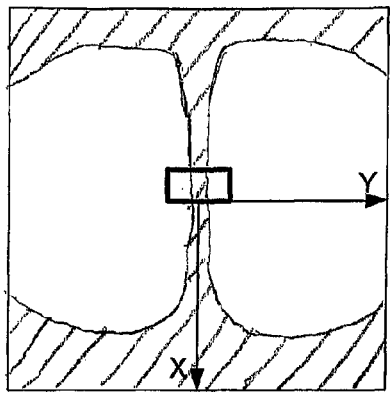
Single Loop
Figure 30
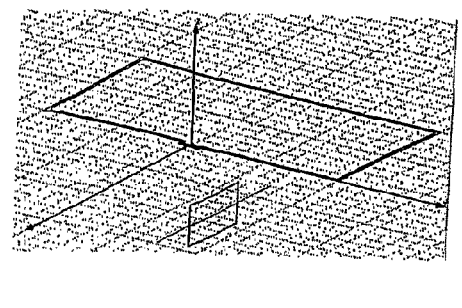
Tag position
Figure 29
BLACK ZONES
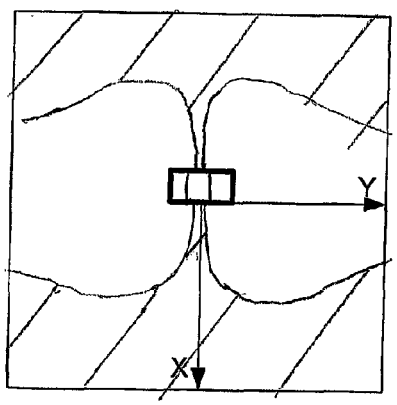
Phased Loops
Figure 32
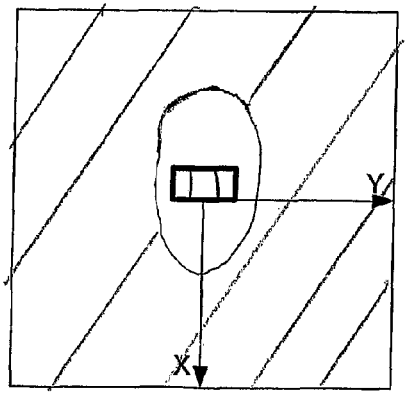
Anti-Phased Loops
Figure 31
BLACK ZONES 

Single Loop  BLACK ZONES

Tag position

Phased Loops

Anti-Phased Loops

BLACK ZONES

DUAL LOOP MAGNETIC EXCITATION FOR MAIL TAG

CROSS-REFERENCE TO RELATED APPLICATIONS

This application claims priority to "DUAL LOOP MAGNETIC EXCITATION FOR MAIL TAG," having serial number PCT/CA2006/001164, filed on Jul. 14, 2006, which claims priority to U.S. provisional application: "DUAL LOOP MAGNETIC EXCITATION FOR MAIL TAG," having Ser. No. 60/698,962, filed on Jul. 14, 2005, which is entirely incorporated herein by reference.

FIELD OF THE INVENTION

The present invention relates to logistical passage measurement systems. More specifically the invention relates to radio frequency transponders used in such systems.

BACKGROUND OF THE INVENTION

Logistical passage measurement systems are used to collect logistical process information, permitting track and trace and statistical analyses. Radio frequency transponders are used in conjunction with strategically placed readers and antennas throughout a logistical process. One logistical object may be to identify the passage of objects, people, etc. The readers may be particularly useful at points of object exchange or at a point where an identifiable event occurs.

There are systems in place to collect automatically the time and position of an object automatically. This equipment is typically installed throughout industrial and commercial facilities and permits automated collection or measurement of time of arrival data. Equipment composed of antennas and readers are positioned at portals covering points of entry. Antenna and or multiple sets of antennas are position on the sides and in some cases on the top of the portal to permit the illumination of Radio Frequency tags in any orientation on a pallet or container coming through a portal. Antenna's are connected to a single reader and multiplexed in time illuminating RFID tags and processing reflected tag identification information. Alternatively multiple readers connected to one or more antenna covering the portal are synchronized to operate on different frequency channels to read tags passing through the portals. These existing systems operate at LF, HF and UHF frequencies where there is a direct relationship between the incident signal and reflected and or returned signal. Common problems with these types of systems include the reading of tags by adjacent readers. This phenomenon is referred to as cross reads by the Auto ID industry.

One approach to addressing the aforementioned problem is disclosed in U.S. Pat. No. 5,450,492 to Hook et al. The tag reader system of that disclosure relies on the independence of incident signal to the response—referred to in the industry as a dual frequency solution. There is no relationship in time between the incident and response signal. The response frequency is not derived from the incident frequency. This independence allows for communication or wake up of many tags entering a portal simultaneously. The simple wake up antennas preceding this art produced stationary magnetic fields, i.e. the magnetic field does not change direction in time for a specific point in space. However, Hook et al. does not fully address random tag orientation.

In applications where tag orientation is unpredictable the tags may be parallel with the field lines; in this case excitation, wake up, or turn on of the tags is difficult and often achieved by increasing radiated power to the maximum allowable limits to achieve acceptable results. Even with increased power there will still be areas within the foot print where some tags fail to turn on. Increasing the power to compensate for power creates large foot prints resulting in overlap in applications where dock doors are in close vicinity to one another. This is a common problem in current systems of today.

In order to improve portal response and eliminate or minimize cross reads the present invention uses a novel and innovative approach to creating an alternating magnetic field and magnetic vectors at necessary field strength within a given space to activate or turn on tags in any orientation within an exciter unit foot print.

SUMMARY OF THE INVENTION

Accordingly, in one aspect the present invention there is provided a logistical passage measurement system comprising: an excitation unit having dual loop antennae, and a control box for exciting said antennae in order to generate a non-zero magnetic field at each point and each orientation in an immediate vicinity of said antennae.

BRIEF DESCRIPTION OF THE DRAWINGS

An embodiment will now be described more fully with reference to the accompanying drawings in which:

FIGS. 25 through 28 show a horizontal tag orientation (26) and corresponding comparison of overhead projection of Z component magnetic field strength between the single loop simulation (25), and the dual loop simulation, both phased (27) and anti-phased (28);

FIGS. 29 through 32 show a vertical longitudinal tag orientation (29) and corresponding comparison of overhead projection of Y component magnetic field strength between the single loop simulation (30), and the dual loop simulation, both phased (32) and anti-phased (31)

DETAILED DESCRIPTION OF THE EMBODIMENT

In the following description, an embodiment of a method of producing progressive video signals from interlaced inputs is provided.

According to one embodiment of the invention there is a dual low frequency antenna unit and driver, referred to as the Exciter Unit [EU]. The EU is designed to operate standalone or as a unit in a multi-drop asynchronous network (e.g. RS485). When connected to a network, it may receive an address. Functions preferably implemented into the EU are: Low frequency (LF) field generation using a dual loop antenna; Remote configurability; addressability compatible with a RS485 network; UHF transmitting capability; Local optical signalization; LF field generation driven by motion sensors.

Figure 1:
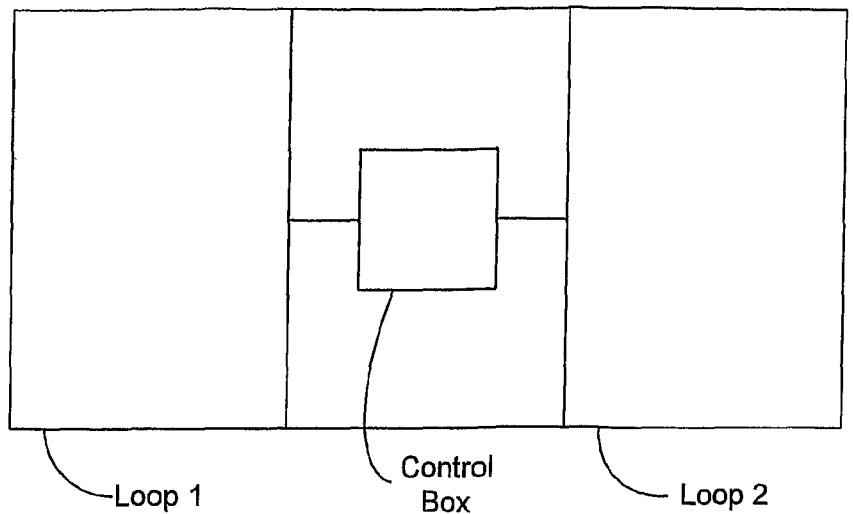
FIG. 1 shows a functional excitation unit installed in a distribution centre.

FIG. 1 shows one embodiment of a functional EU unit installed in a distribution centre. This EU has two loop antennae (Loop 1 and Loop 2) and a control box for providing the antennae with signal.

Preferable aspects of the LF field generated by this EU are a 125 KHz carrier modulated by on/off keying [OOK] with an excitation ID recognition pattern.

The modulated carrier may be amplified by a pair of amplifiers to create independent carriers. These carriers are applied to the two elements (Loop 1 and Loop 2) of the LF twin antenna. The phases of the carriers applied to the dual LF antenna may be controlled by configuration parameters; they can be permanent in-phase, permanent anti-phase or switched between in-phase (for even data frames) and anti-phase (for the odd data frames).

A data frame is the minimum amount of time for an EU to transmit all the data required to activate a tag (approx 200 ms). The carrier phase may be the only difference between even data frames and the odd data frames. The ON-OFF modulating signal is, preferably, the same, in-phase, for both carriers. The levels of the LF voltage on the taps of the dual antenna elements can be set differently for in-phase and anti-phase frames; for example low level for the in-phase data frames and high level for the anti-phase data frames.

Figure 2:
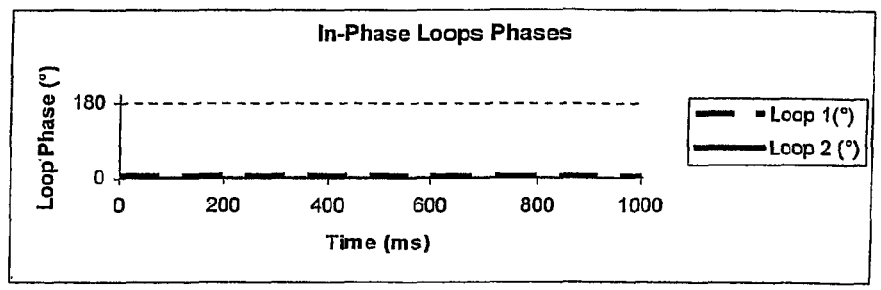
FIG. 2 show phase and voltage graphs for permanent in-phase modulation, where odd and even data frames have the same value.
Figure 2:
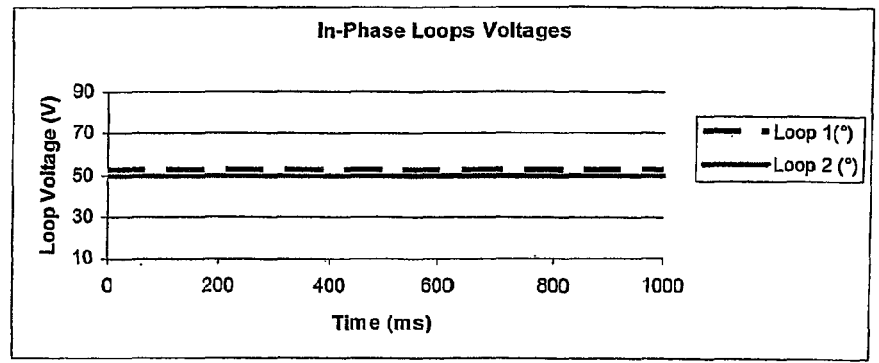
Figure 3:
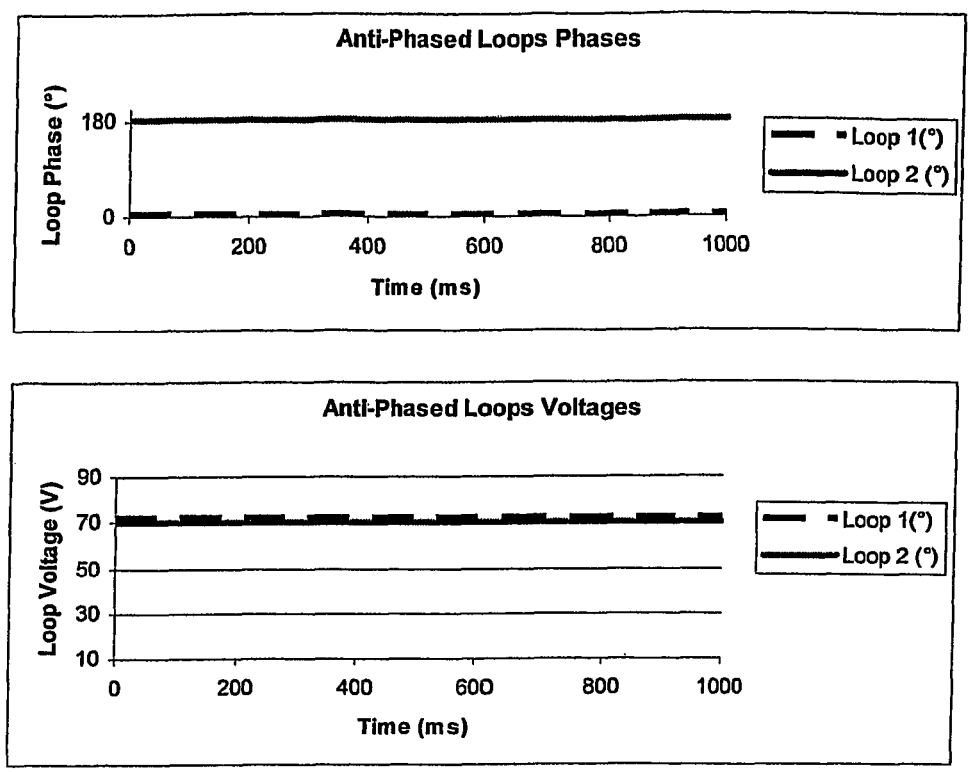
FIG. 3 show phase and voltage graphs for permanent anti-phase modulation, where odd and even data frames have the same value.
Figure 4:
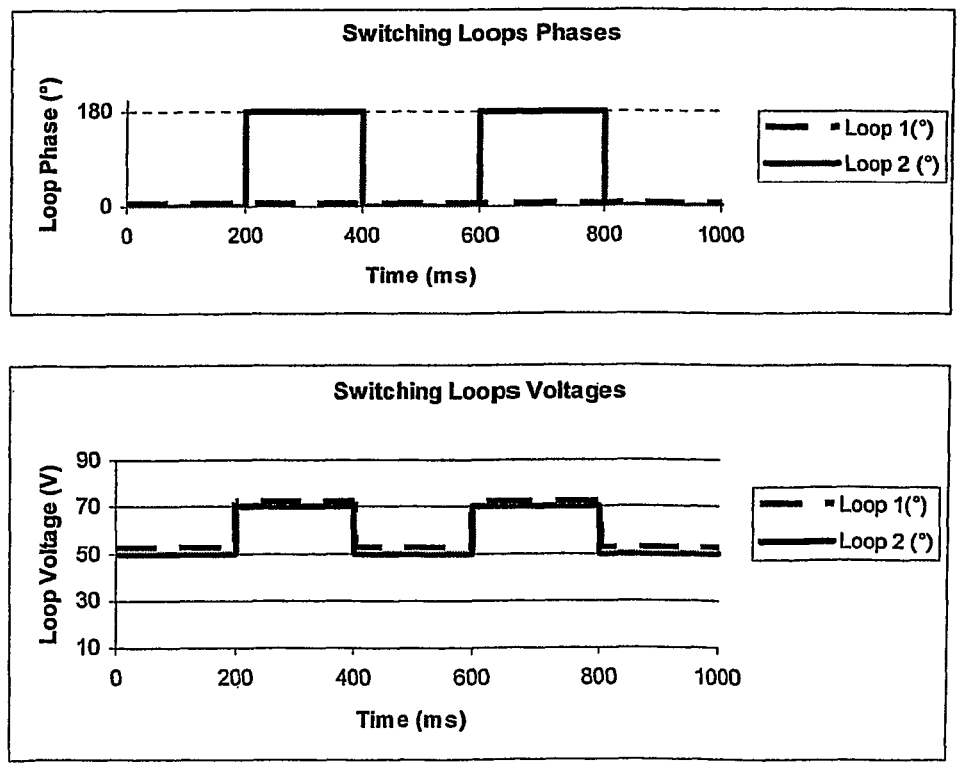
FIG. 4 show phase and voltage graphs for switching modulation, where odd and even data frames have the alternating values.

The graphs in FIGS. 2, 3 and 4 show phases and voltages for each loop as an example of such modulation.

Using the alternating excitation process of FIG. 4, it is possible to generate a LF field which is the result of superposition of the field generated by two loops driven by carrier signals controlled in phase and amplitude. The result is varying magnetic vectors as the antennas are switched between in-phase and anti-phase. This greatly improves the probability of coupling energy to tags in various positions or orientations as will be shown in the simulations below.

Figure 5:
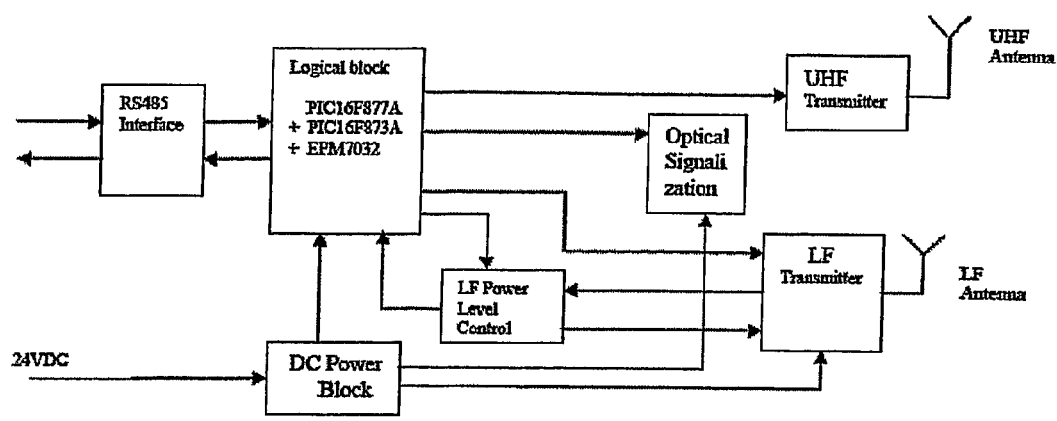
FIG. 5 shows a block diagram of one embodiment of the exciter unit of the present invention.

The main functional blocks of this EU embodiment may be seen in FIG. 5. They are as follows: the logical block (according to one embodiment 2 microcontrollers and programmable logic device), the asynchronous serial interface (according to one embodiment an RS485), the UHF (preferably 433.92 MHz) transmitter, the LF (preferably 125 KHz) transmitter, the optical signalization block, the LF power level control and the power block.

Figure 7:
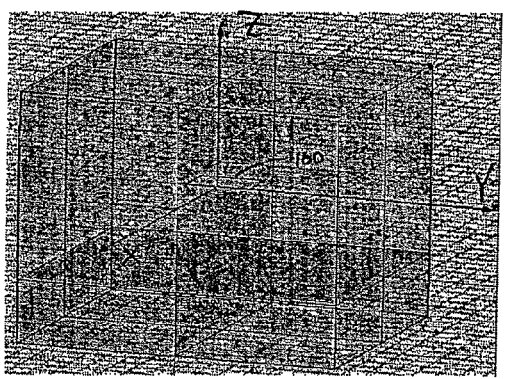
FIG. 7 shows a perpective of the simulation setup of FIG. 6.
Figure 6:
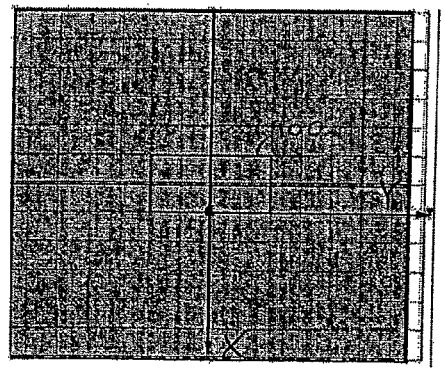
FIG. 6 shows an overhead of a simulation setup for a single loop.

FIG. 7 shows the simulation setup for a 1 m by 2 m-rectangular single loop antenna 100 operating at 125 kHz. The antenna 100 is located, by definition, along one horizontal plane through the origin (along the XY plane, which is shown in FIG. 6). The field is simulated over the volume surrounding antenna 100.

In FIGS. 8 through 10, 3 planes are defined for the display of total and/or component magnetic field strength: XY, XZ, and YZ. The XY plane is 2 m below the origin. The other planes are coincident with the origin. This is significant as tags may be understood to pass approximately 2 m below the antenna 100. The XY plane is the most significant plane insofar as tags will generally move along the XY plane, and especially along the intersection of the XY and XZ planes.

The magnetic field generated by the loops may be represented by a 3D vector field, since the magnetic field strength will vary both with respect to location and orientation. Tags designed with a single simple receiving loop antenna are usually only sensitive to the Magnetic field component normal to the loop surface. It is assumed that, in a standard installation that in all cases that the tags move along the X-axis at not more than 2 m below the loops. This is considered the worst case.

Three basic tag positions with respect to this coordinate system can be identified. These extreme positions are sensitive only to one of the 3 component aspects (x,y,z) of the total magnetic field. Any other orientation would be sensitive to some combination of components.

Figure 11:
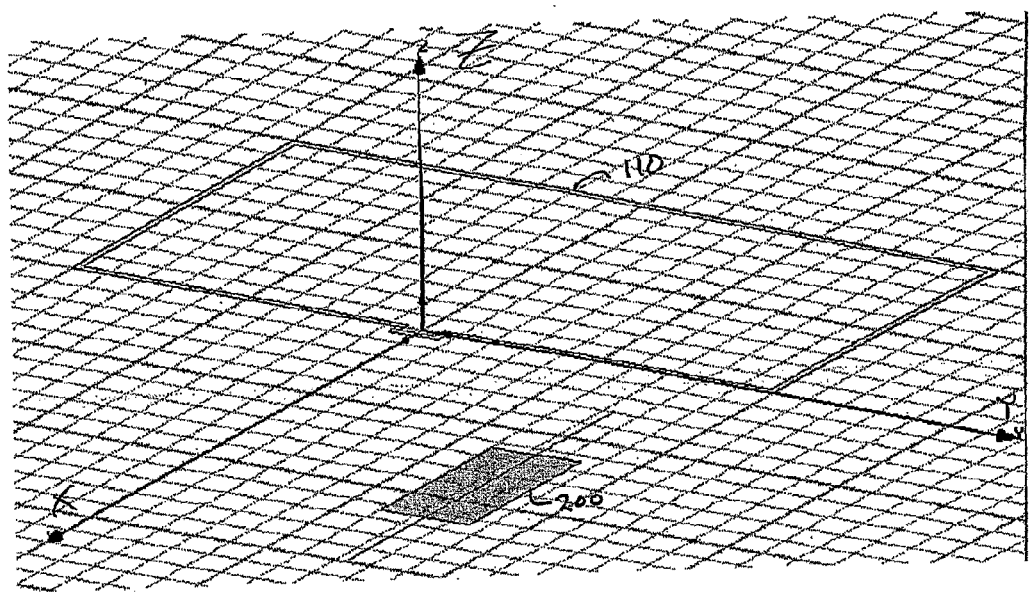
FIG. 11 shows one orientation of a tag to a single loop.
Figure 12:
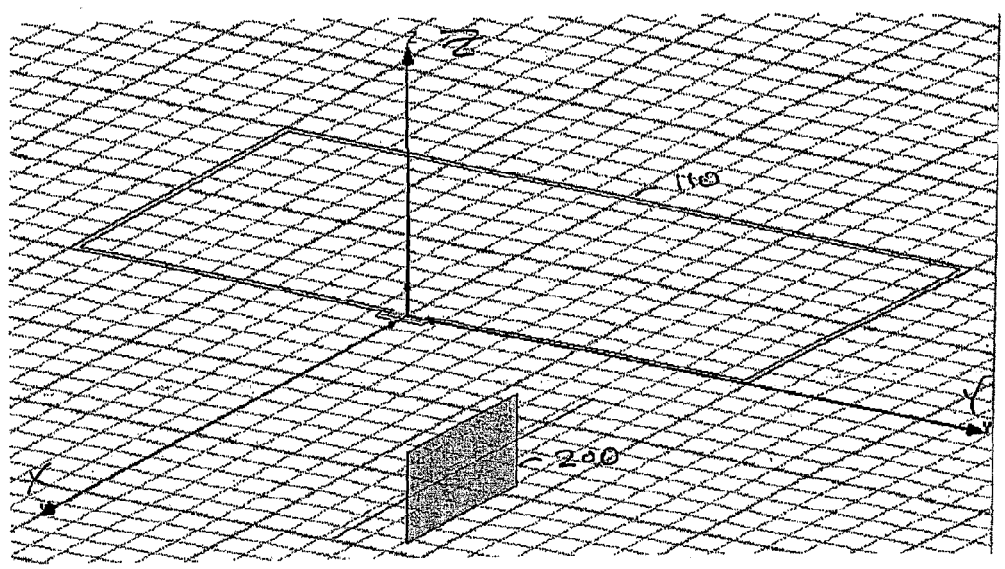
FIG. 12 shows another orientation of a tag to the same loop.
Figure 13:
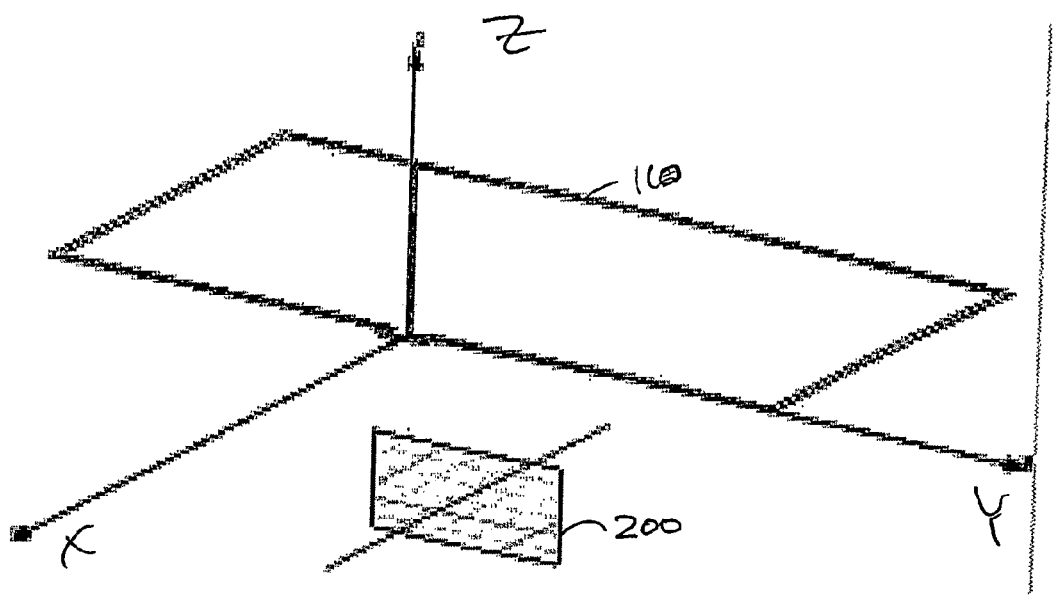
FIG. 13 shows a third orientation of a tag to that same loop.

The three basic tag positions are shown in FIGS. 11, 12 and 13. In FIG. 11 a horizontal tag 200 will only be activated by the z component of a magnetic field eminating from generic antenna 110. In these pictures tags are not at scale.

In FIG. 12, a vertical longitudinal tag (along the XZ plane) will only sense the y component. In FIG. 13, a vertical transverse tag (along the YZ plane) will only sense the x component.

Figure 14:
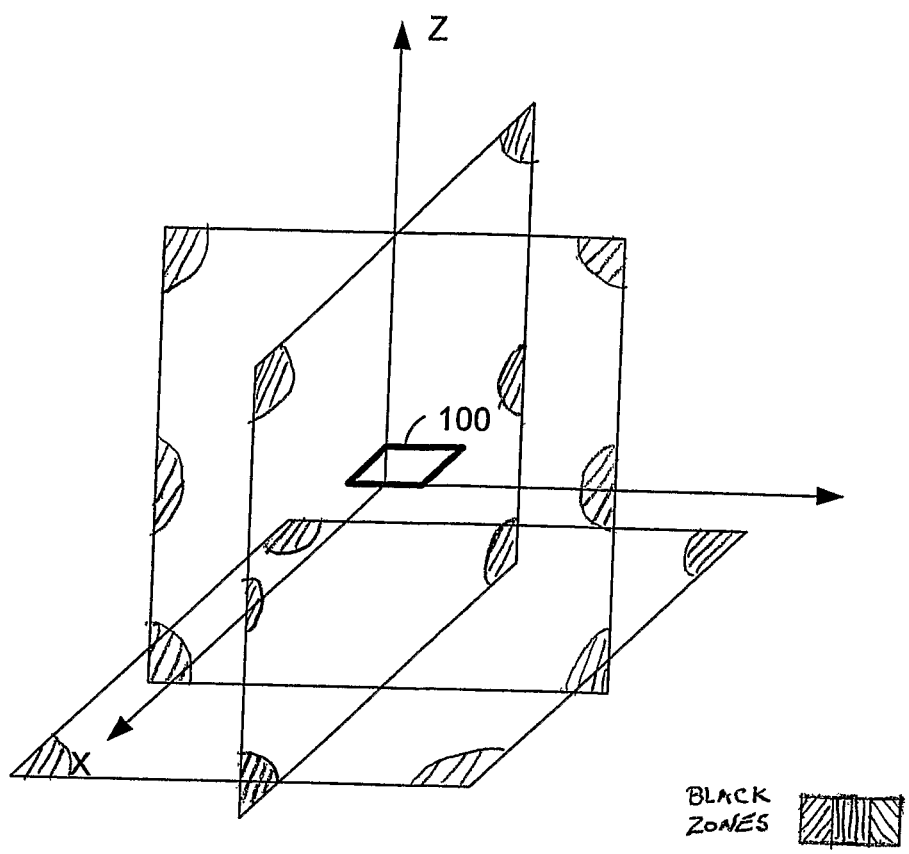
FIG. 14 shows a graphical volume projection of total magnetic field strength for the single loop simulation.

The view of total magnetic strength in FIG. 14 gives some basic information of the chance of exciting a randomly oriented tag 200 located in a certain point in space. Black zones are field-less regions. All around the loop, especially at the target, 2 m below origin) there is adequate field (Dark grey). However, the total field strength does not account for the interaction of field and tag 200 by orientation.

Figure 15:
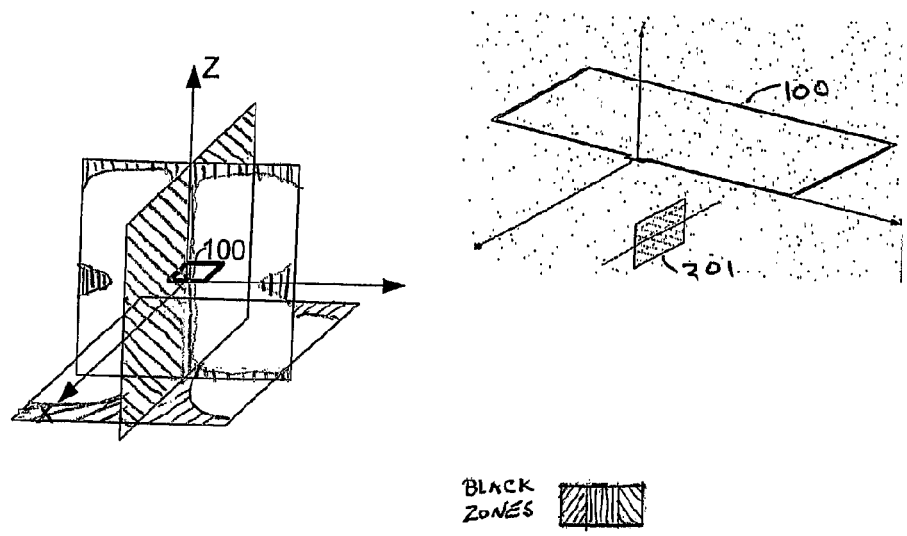
FIG. 15 shows a graphical volume projection of Y component magnetic field strength for the single loop simulation.

The Y component strength view in FIG. 15 shows that a perfectly vertical longitudinal tag 201 (in the plane XZ) and travelling along the middle of the loop will likely not be excited by a single loop antenna 100.

Figure 16:
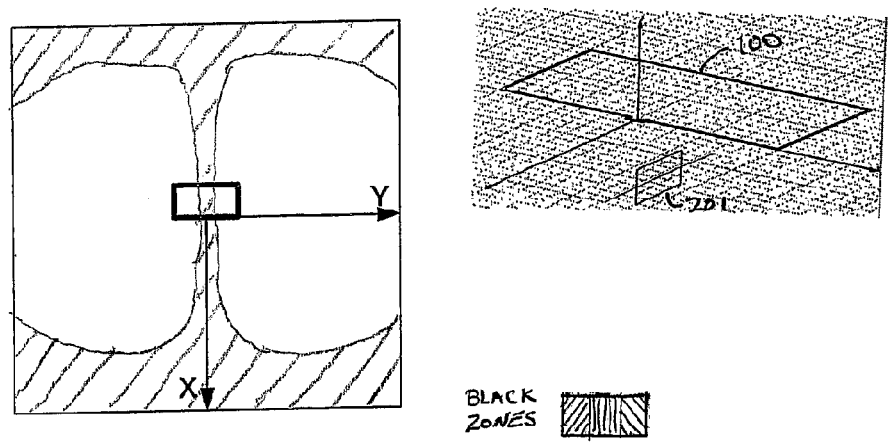
FIG. 16 shows an overhead projection of Y component magnetic field strength and the vertical longitudinal tag that would correspond to the Y component field for the single loop simulation.
Figure 17:
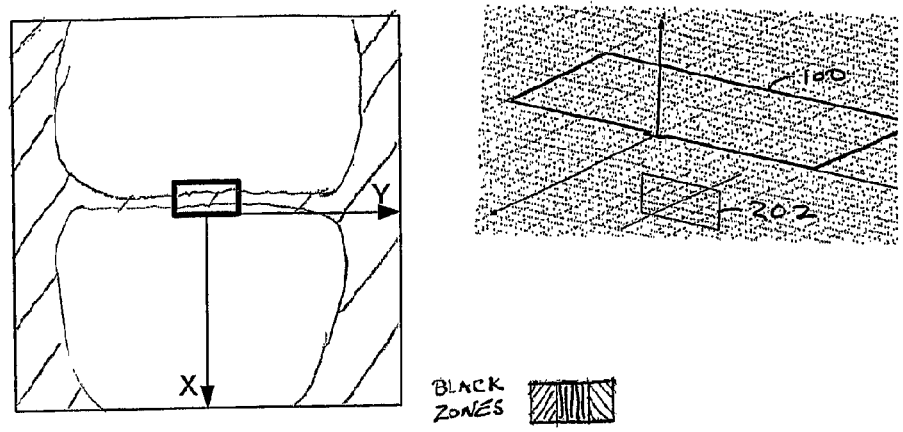
FIG. 17 shows an overhead projection of X component magnetic field strength and the vertical transversal tag that would correspond to the X component field for the single loop simulation.
Figure 18:
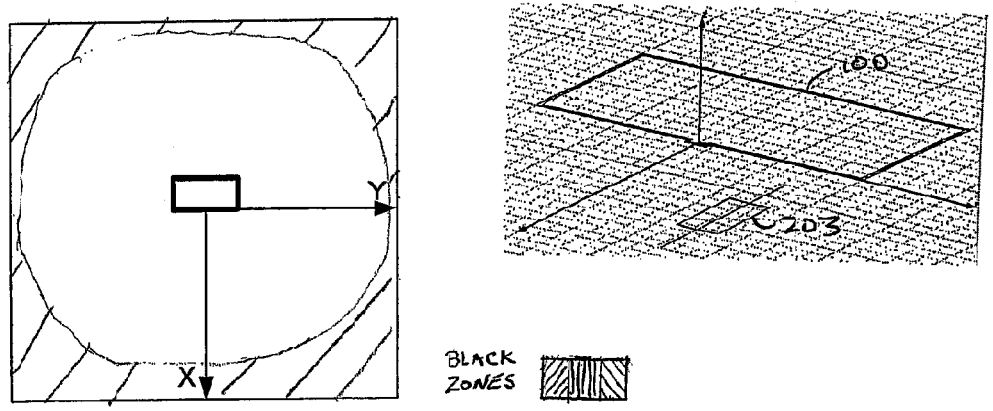
FIG. 18 shows an overhead projection of Z component magnetic field strength and the horizontal tag that would correspond to the X component field for the single loop simulation.

The excitation of a perfectly vertical longitudinal tag 201 moving along the intersection of the XY and XZ planes may be understood from examining the overhead projection of Y component field strength in the XY plane (FIG. 16). The perfectly vertical longitudinal tag 201 moves from the centre bottom to centre top of the projection, entirely within a region of inadequate component field strength. FIG. 16 shows that a vertical longitudinal tag will likely not be excited.

The excitation of a perfectly vertical transverse tag 202 moving along the intersection of the XY and XZ planes may be understood from examining the overhead projection of X component field strength in the XY plane (FIG. 16). The perfectly vertical transverse tag 202 moves from the centre bottom to centre top of the projection; the component field strength is adequate except for an interruption directly below the antenna.

The excitation of a perfectly horizontal tag 203 moving along the intersection of the XY and XZ planes may be understood from examining the overhead projection of Z component field strength in the XY plane (FIG. 16). The perfectly horizontal tag 203 moves from the centre bottom to centre top of the projection; the component field strength is adequate. The horizontal tag 203 will be excited.

As can be seen from the further simulations, according to one embodiment, the variance of interaction due to orientation is overcome by a dual loop alternating phase antennae.

Figure 19:
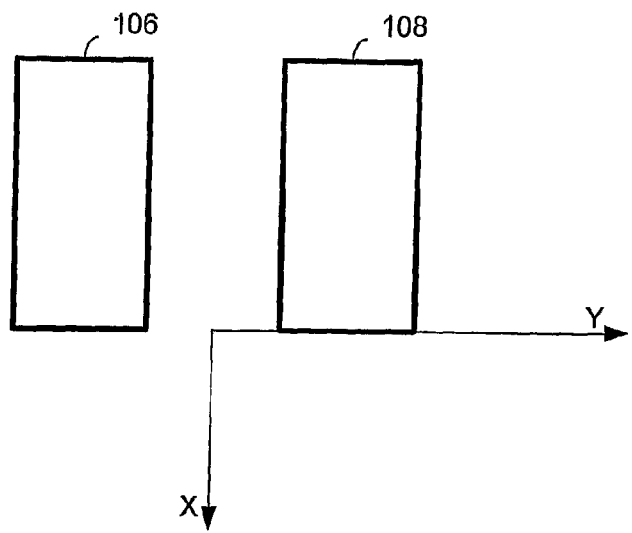
FIG. 19 shows an overhead of a simulation setup for a dual loop.

As seen in FIG. 19, two 0.5 m by 2 m rectangular loops 106 and 108 operating at 125 kHz were simulated. The loops are located, by definition, along one horizontal plane through origin along the XY axis. Total occupied area is 1 m by 1.5 m, which is slightly smaller than in the single loop simulation. The loops, as produced, may be shielded inside aluminium tubes in order to reduce the ground capacitive eddy currents and de-tuning by nearby objects or human hand through capacitive coupling.

Figure 8:
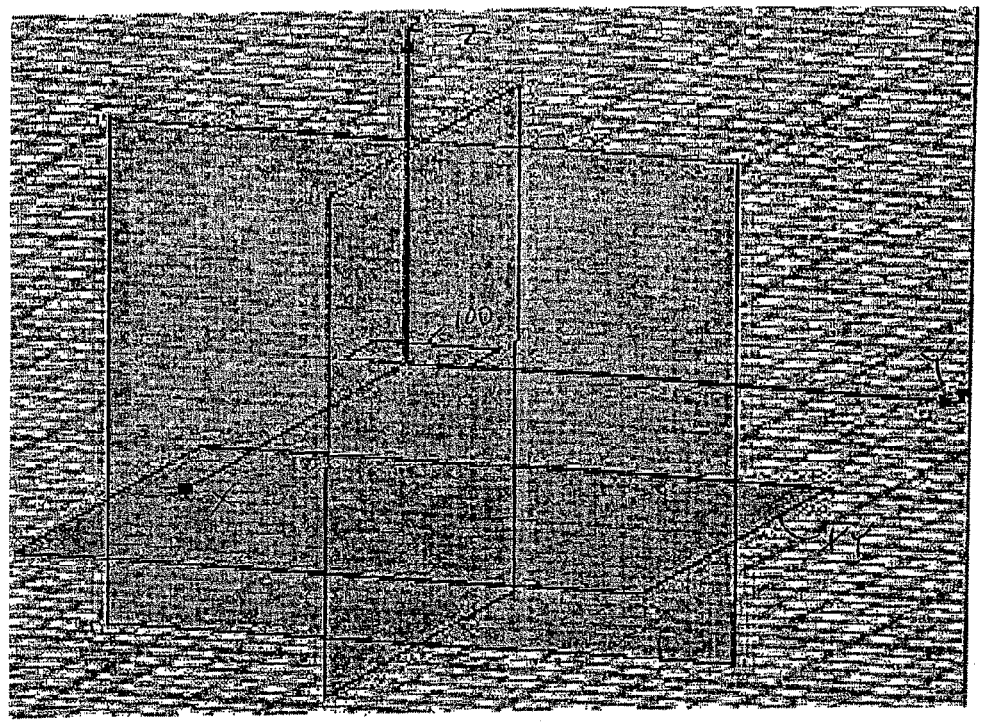
FIG. 8 shows the definition of the XY field overlay plane.
Figure 9:
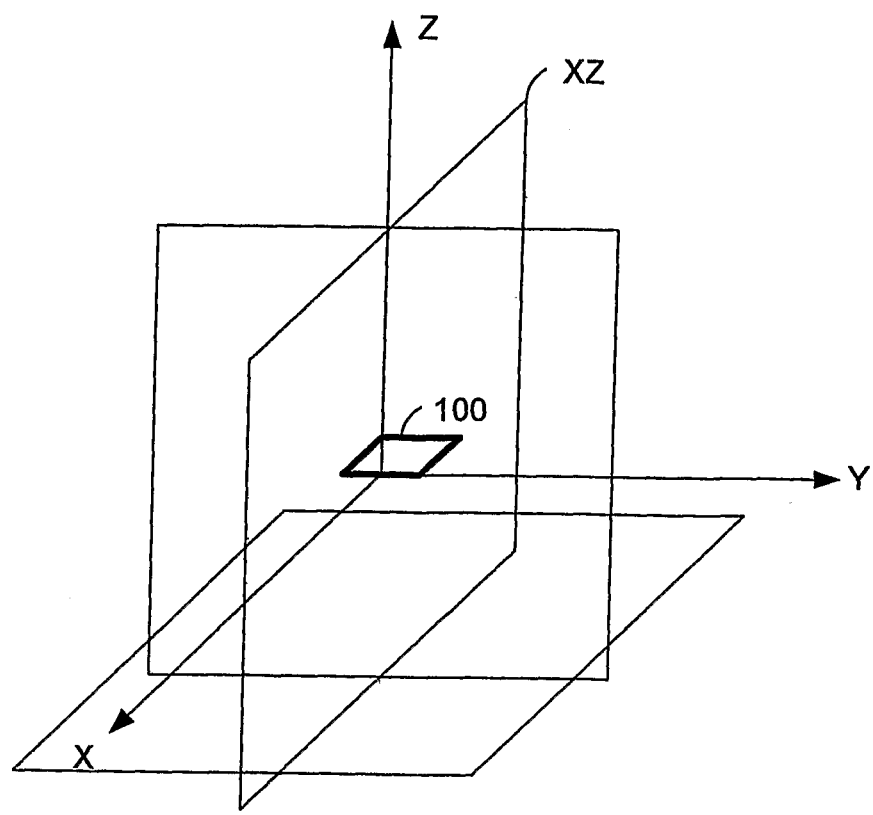
FIG. 9 shows the definition of the XZ field overlay plane.
Figure 10:
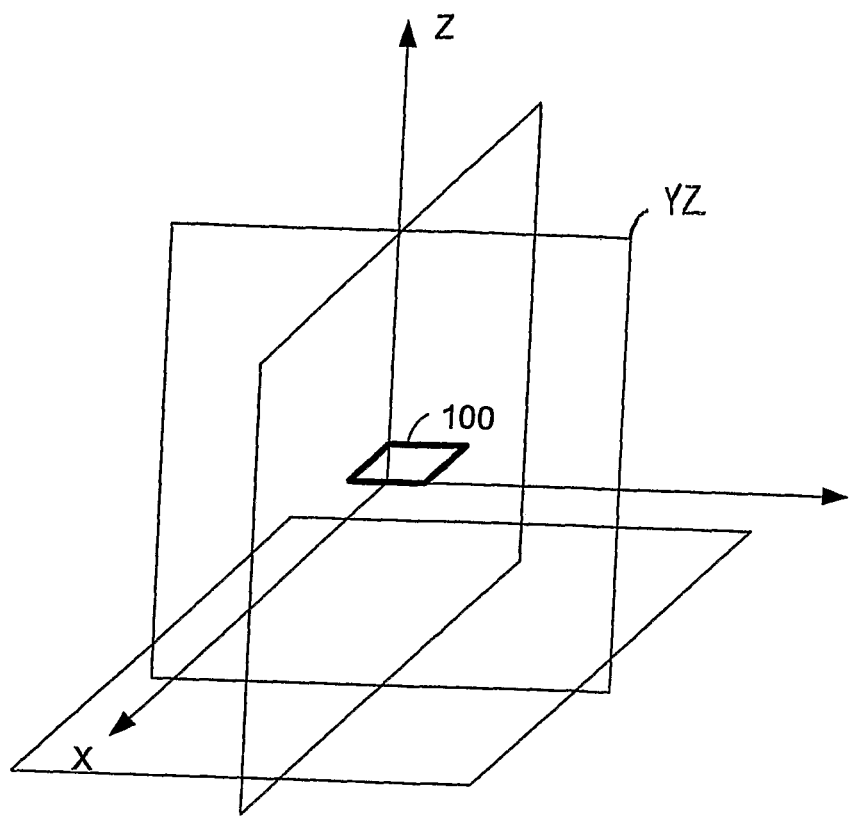
FIG. 10 shows the definition of the YZ field overlay plane.

For simulation purposes, the same planes as for a single loop exciter are used through the dual loop test (see FIGS. 8 through 10, wherein the antennae 106 and 108 generally fit in the footprint of antennae 100). The planes reference position is as per FIG. 19, through the middle of the loops. Tag orientation is similarly defined again as per FIGS. 11 to 13 wherein the antennae 106 and 108 generally fit in the footprint of generic antennae 110.

In this simulated embodiment of the invention, the EU uses two loops and alternates the relative excitation phase for the one loop from one frame to the next (preferably 180 degrees every 200 ms). In this case the combined magnetic field will change and the likelihood of exciting all tags regardless of their position with respect to loops is much increased.

Figure 20:
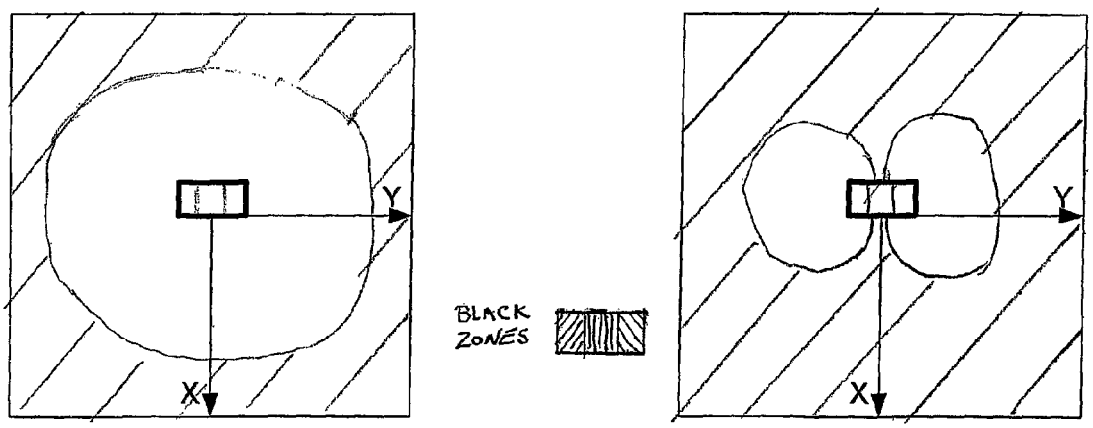
FIG. 20 shows an overhead projection of total component magnetic field strength for phased (left) and anti-phased (right) modulation for the dual loop simulation.

FIG. 20 shows an overhead projection of total component magnetic field strength for phased (left) and anti-phased (right) modulation for the dual loop simulation. Since the fields alternate, If either field is adequate (dark grey) it means the tags will be excited in that area.

Figure 21:
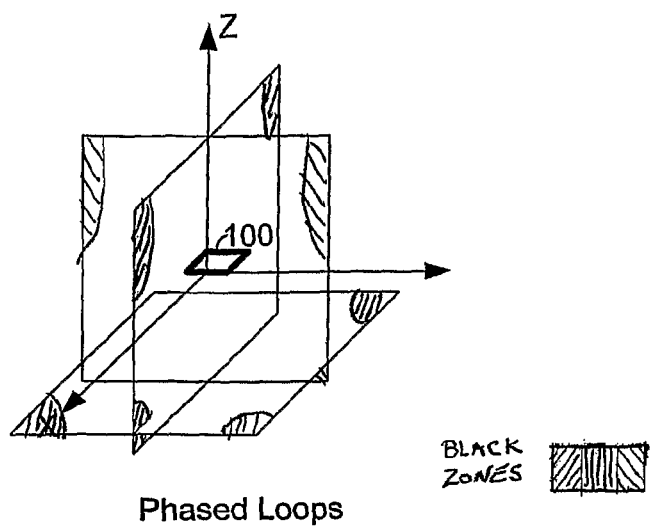
FIGS. 21 (phased) and 22 (Anti-Phased) shows a graphical volume projection of total magnetic field strength for the dual loop simulation.
Figure 22:
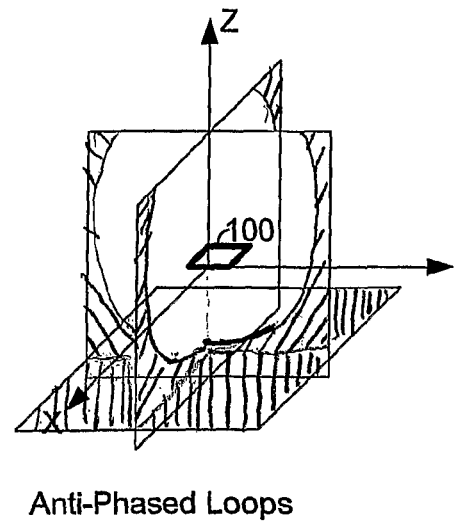
Figure 24:
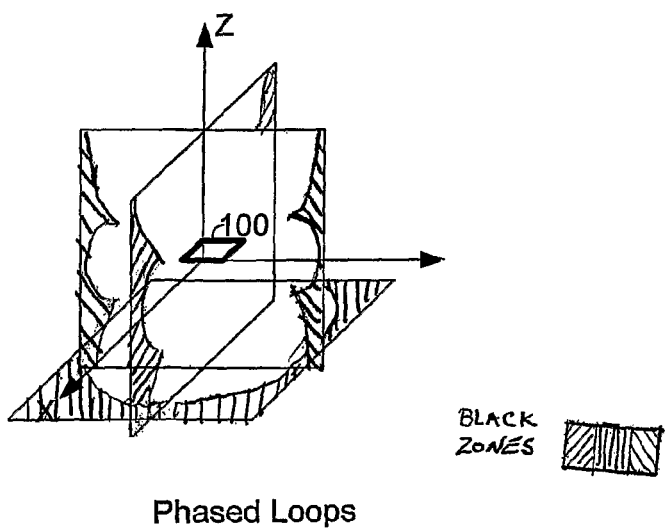
FIGS. 24 (phased) and 23 (Anti-Phased) show a graphical volume projection of Z component magnetic field strength for the dual loop simulation.
Figure 23:
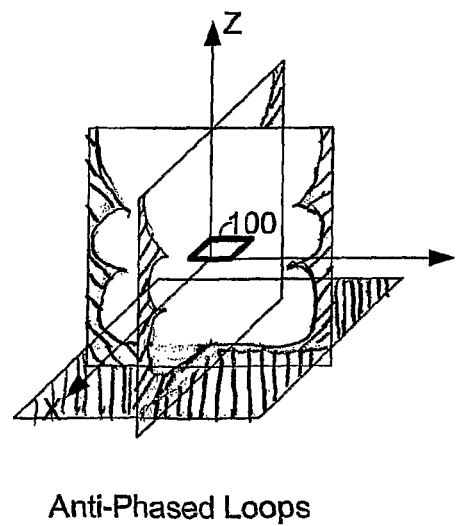

FIGS. 21 and 22 show total field strength along the three overlay planes for the dual loop alternating phase antennae. FIGS. 23 and 24 show the corresponding Z component strength.

FIGS. 25 through 28 detail the interaction of a horizontal tag. FIG. 26 indicates the tag orientation. FIG. 25 shows the corresponding overhead projection of Z component magnetic field strength for the single loop simulation. FIGS. 27 (phase) and 28 (anti-phase) shows the corresponding overhead projection of Z component magnetic field strength for the dual loop simulation. Note that, because the single loop is adequate for horizontal tags, the dual loop is not particularly advantageous in this situation. It equals the performance of the single loop, with the phased portion of the excitation cycle proving the interaction.

FIGS. 29 through 32 detail the interaction of a vertical longitudinal tag. FIG. 29 indicates the tag orientation. FIG. 30 shows the corresponding overhead projection of Z component magnetic field strength for the single loop simulation. FIGS. 32 (phase) and 31 (anti-phase) shows the corresponding overhead projection of Y component magnetic field strength for the dual loop simulation. Note that, because the single loop is inadequate for horizontal tags, the dual loop is advantageous in this situation. It interacts whereas the single loop does not at any point along the likely transit of the tag (intersection of XY and XZ planes). The anti-phased portion of the excitation cycle provides the interaction.

Figure 34:
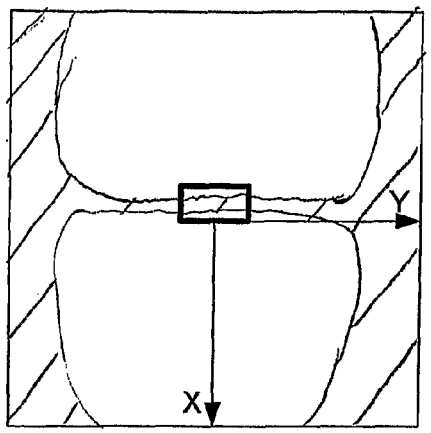
FIGS. 33 through 36 show a vertical transversal tag orientation (33) and corresponding comparison of overhead projection of X component magnetic field strength between the single loop simulation (34), and the dual loop simulation, both phased (35) and anti-phased (36).
Figure 34:
Figure 33:
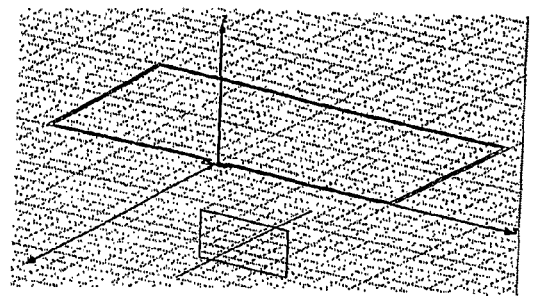
Figure 35:
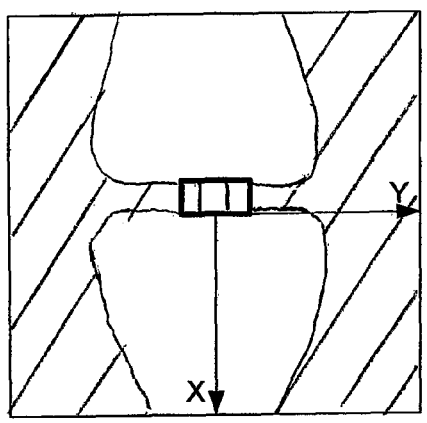
Figure 36:
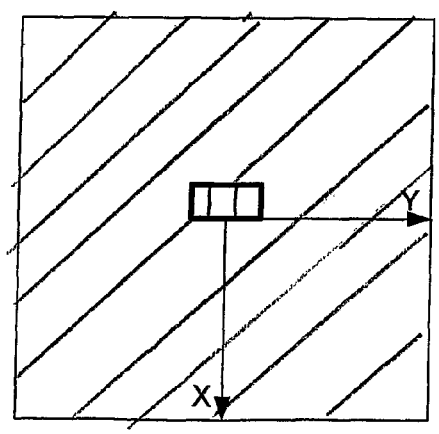

FIGS. 33 through 36 detail the interaction of a vertical transverse tag. FIG. 33 indicates the tag orientation. FIG. 34 shows the corresponding overhead projection of Z component magnetic field strength for the single loop simulation. FIGS. 35 (phase) and 36 (anti-phase) shows the corresponding overhead projection of X component magnetic field strength for the dual loop simulation. Note that, because the single loop is adequate for horizontal tags, the dual loop is not particularly advantageous in this situation. It equals the performance of the single loop, with the phased portion of the excitation cycle proving the interaction.

Thus, there will be no coverage gap underneath EU loops. The dual-antennae alternating-phase approach allows for lower field strengths reducing overlap in adjacent areas while achieving tag activation or wake up in any orientation.

The EU can also be programmed to dynamically adjust the current amplitudes for each loop synchronously while changing the relative phases. As can be seen in FIG. 20 when the currents are in phase the overall field is stronger, so it may be preferable to decrease the currents in this case in order to decrease inter-gate excitation for a multi-gate operation.

FIGS. 20 through 36 show the typical situation only, when the phase difference is 180 degrees and the current amplitudes are equal for both loops. If the EU is programmed with different values the resultant magnetic field will be asymmetrical and this can be advantageous for particular situations. One example would be when physical considerations Prevent the placement of the antennae centered above the gate due to, for example, a structural or a heating or ventilation element. In this case one may install the antennae shifted to the side and adjust the parameters to produce an asymmetrical field to properly cover all gate width.

The generation of the excitation field can be optionally controlled, activated and/or terminated by external motion sensors.

The operation of the EU may be controlled by a number of functional parameters. These parameters may be set during its configuration session. This configuration can be performed through an asynchronous serial communication port, using a PC and a serial communication program such as ProComm. When the EU is connected in a network it may be assigned a unique address. There may be several specific commands which can be used to configure or to query the EU parameters values.

Although embodiments have been described, those of skill in the art will appreciate that variations and modifications may be made without departing from the spirit and scope thereof as defined by the appended claims.

What is claimed is:

1. A logistical passage measurement system comprising:
   an excitation unit having dual loop antennae, comprising a first loop and a second loop, said two loops located in and parallel to the same plane; and
   a control box for exciting said dual loop antennae, said control box configured to drive a first current into the first loop at a first phase and a second current into the second loop at a second phase, the phase difference between the first and second currents alternating with time between 0° and 180°, and the amplitude of the first and second currents having a first level when the phase difference is 180° and a second level, lower than the first level when the phase difference is 0°.

2. The logistical passage measurement system according to claim 1, wherein the excitation unit comprises a dual low frequency antenna unit and driver.

3. The logistical passage measurement system according to claim 1, wherein the excitation unit generates a low frequency field using the dual loop antennae.

4. The logistical passage measurement system according to claim 3, wherein the low frequency field is generated using a modulated 125 KHz carrier.

5. The logistical passage measurement system according to claim 4, wherein the modulated carrier is amplified by a pair of amplifiers to create an independent carrier for each loop of the dual loop antennae.

6. The logistical passage measurement system according to claim 1, wherein a low frequency field is generated as a result of superposition of fields generated by the two loops driven by carrier signals controlled in phase and amplitude.

7. The logistical passage measurement system according to claim 1, wherein the excitation region is symmetrical.

* * * * *